United States Patent

Carlson

[15] 3,676,786

[45] July 11, 1972

[54] LOCKED OSCILLATOR CIRCUITS

[72] Inventor: Herbert Neil Carlson, Berkeley Heights, N.J.

[73] Assignee: Bell Telephone Laboratories, Incorporated, Murray Hill, N.J.

[22] Filed: Nov. 30, 1970

[21] Appl. No.: 93,771

[52] U.S. Cl. ..............................329/122, 325/419, 325/445, 329/112, 331/23

[51] Int. Cl. ..........................................................H03d 3/24

[58] Field of Search ..................329/50, 112, 119, 122, 124, 329/126; 331/23, 25, 18, 21, 22, 20, 26; 325/346, 419, 445, 446

[56] References Cited

UNITED STATES PATENTS

| | | | |
|---|---|---|---|
| 3,195,059 | 7/1965 | Adams | 329/50 X |
| 3,479,600 | 11/1969 | Miller | 325/346 X |
| 2,671,851 | 3/1954 | Houck | 329/119 |
| 3,479,607 | 11/1969 | Ruthroff | 329/122 X |
| 3,079,563 | 2/1963 | Marsh et al. | 325/346 X |
| 3,383,607 | 5/1968 | Avins | 329/119 |

*Primary Examiner*—Alfred L. Brody
*Attorney*—R. J. Guenther and Arthur J. Torsiglieri

[57] ABSTRACT

One embodiment of a microwave FM demodulator comprises first and second branches to which the input FM signal is applied. The signal on the first branch controls the output phase of an injection-locked oscillator. The output of the oscillator and the signal on the second branch are combined by a hybrid coupler and applied to a balanced phase-sensitive detector comprising first and second oppositely-poled diodes connected to opposite sides of an output resistance. A center tap on the output resistor derives a voltage having an amplitude proportional to the input signal frequency. In another embodiment, the locked oscillator is connected to a reflection-type transmission line with transmission line probes used for deriving inputs to the balanced detector. In other embodiments, the output voltage is used to make the locked oscillator center frequency track the input locking frequency.

4 Claims, 6 Drawing Figures

Patented July 11, 1972 3,676,786
FIG. 1
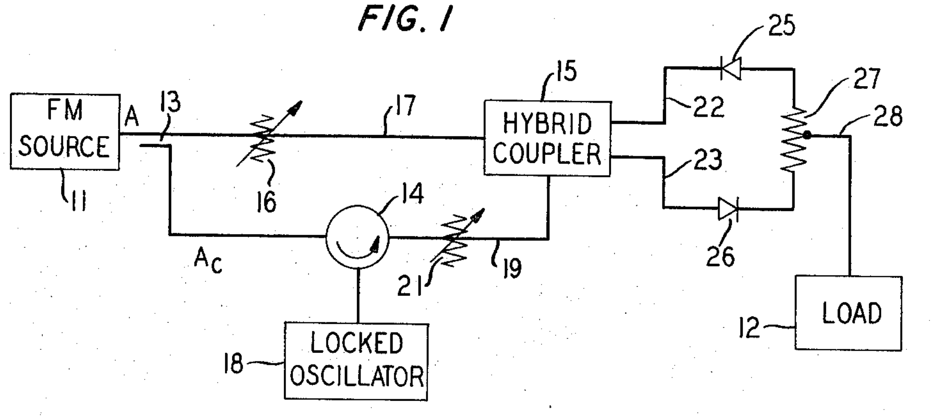
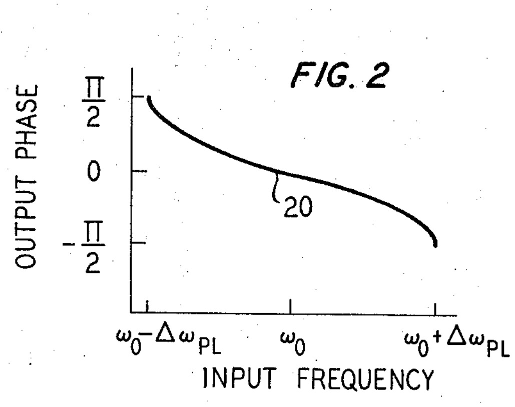
FIG. 3
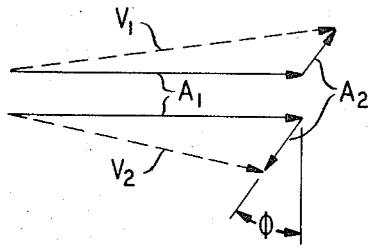
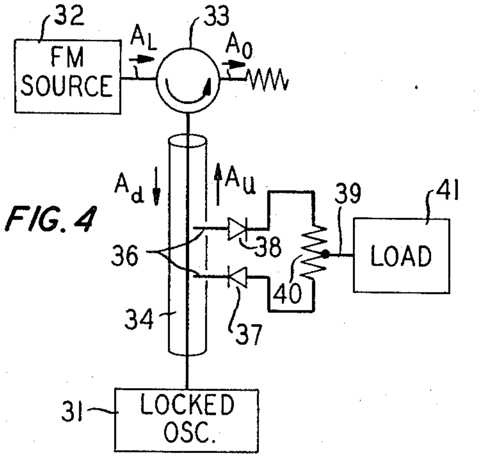
FIG. 5
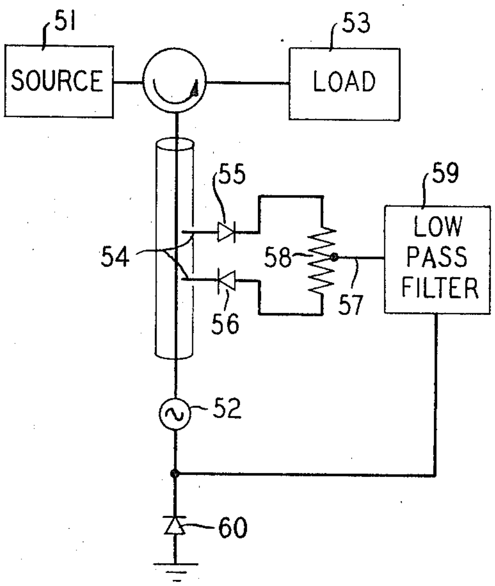
FIG. 6
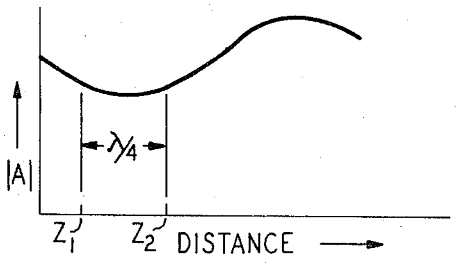
INVENTOR
H. N. CARLSON
BY
ATTORNEY

LOCKED OSCILLATOR CIRCUITS

BACKGROUND OF THE INVENTION

This invention relates to circuits using locked oscillators, and more particularly, to FM demodulators and power amplifiers.

The paper of C. L. Ruthroff, "Injection-Locked Oscillator FM Receiver Analysis," Bell System Technical Journal, Vol. 47, pages 1,653–1,661, Oct. 1968, analyzes an FM demodulator using an injection-locked oscillator and gives references to early work in this area. Such demodulators comprise first and second branches to which the input FM signal to be demodulated is applied. The signal on the first branch controls the output phase of a locked oscillator. The output of the oscillator from the first branch, together with the FM input signal from the second branch, are applied to a diode detector which generates an output voltage having variations proportional to the variations of the input frequency. Thus, input FM modulations are converted to output amplitude modulations as is required for FM demodulation or discrimination.

The paper of Osborne et al., "Injection-Locked Avalanche Diode Oscillator FM Receiver," Proceedings of the IEEE, Vol. 57, No. 2, Feb. 1969, pages 214–215, describes an experimental version of the locked oscillator demodulator that demonstrates the desirability of this technique at microwave frequencies. The paper points out that newly developed microwave frequency negative resistance devices, such as the tunnel diode, are particularly well suited for use as the active element of the locked oscillator.

The useful information on an incoming FM wave is, of course, described by the frequency modulations and only these frequency modulations should be converted to output amplitude modulations if the demodulator is to work properly. One problem with the Osborne et al. and Ruthroff demodulators is that spurious amplitude modulations on the input FM wave are manifested by spurious output amplitude modulations. Another drawback is that the output amplitude is a function not only of the input carrier frequency, but also of the modulation frequency $\omega_m$. These characteristics are apparent from equation (7) of the Osborne et al. paper that shows the output voltage as being a function of input amplitude $P_s$ and modulation frequency $\omega_m$.

These drawbacks, of course, degrade the linearity of the demodulator. That is, the output voltage of any good frequency demodulator should be a linear function of input frequency, notwithstanding input amplitude or modulation frequency. This is particularly true in microwave communications systems in which the FM carrier wave may be subjected to substantial spurious amplitude modulations.

SUMMARY OF THE INVENTION

It is an object of one embodiment of the invention to reduce or eliminate any sensitivity of an FM demodulator to input amplitude modulations or to modulation frequency.

This and other objects of the invention are attained in an illustrative embodiment of the type described in the Abstract of the Disclosure.

The current generated by the locked oscillator and directed to the hybrid coupler has an amplitude $\sqrt{2}\,A_1$, while the current supplied by the second branch to the hybrid coupler has an amplitude $\sqrt{2}\,A_2$. The hybrid coupler then operates to generate and transmit from its two output ports voltage components $V_1$ and $V_2$ having the form $$V_1^2 = A_1^2 + A_2^2 + 2A_1A_2 \sin \Phi \qquad 1.$$

$$V_2^2 = A_1^2 + A_2^2 - 2A_1A_2 \sin \Phi \qquad 2.$$

where $\Phi$ is the phase shift of current on the first path produced by the locked oscillator.

It will be shown that when voltages $V_1$ and $V_2$ are respectively applied to the oppositely poled diodes, the output voltage derived from the center tap is independent of the input amplitude A, amplitude $A_2$, and modulation frequency $\omega_m$.

This being so, the output amplitude response to input frequency is linear, notwithstanding spurious input amplitude variations or high modulation frequency.

Rather than taking the form described in the Abstract of the Disclosure, an FM demodulator in accordance with the invention may comprise a locked oscillator connected by a transmission line to the second port of a circulator. Input FM energy to be demodulated is applied to the first port of the circulator and, as before, frequency locks the oscillator. The output oscillator frequency is transmitted by the transmission line back toward the circulator.

In accordance with this embodiment, a pair of probes are included in the transmission line between the oscillator and the circulator. With the probes spaced substantially a quarter wavelength apart at the oscillator center frequency, energy originating both from the circulator and from the locked oscillator is derived by the probes. The power of the energy derived by the two respective probes can be shown to be of the form defined by equations (1) and (2). This output is, of course, applied to a balanced detector for conversion to a baseband output voltage as described before.

Since the output voltage is a function of input frequency, the output voltage can be used to cause the oscillator center frequency to track the input frequency. As is well known, locked oscillators can be used for purposes such as power amplification, and in such uses, it is sometimes desirable that the center frequency of the oscillator be varied in accordance with the input frequency as, for example, by changing the bias on a diode that controls the oscillator resonant frequency. Accordingly, the oscillator center frequency can be caused to track the input frequency by using the output voltage from a balanced detector to modify the bias on a control diode.

These and other objects, features, and advantages of the invention will be better understood from a consideration of the following detailed description taken in conjunction with the accompanying drawing.

DRAWING DESCRIPTION

FIG. 1 is a schematic illustration of a frequency demodulator circuit in accordance with one embodiment of the invention;

FIG. 2 is a graph of the output phase of the locked oscillator of FIG. 1 with respect to input frequency;

FIG. 3 illustrates the phasors of output voltage to the detectors of FIG. 1;

FIG. 4 is a schematic illustration of another embodiment of the invention; and

FIG. 5 is a schematic illustration of still another embodiment of the invention;

FIG. 6 is a graph of voltage vs. distance in the transmission line of the embodiments of FIGS. 4 and 5.

DETAILED DESCRIPTION

Referring now to FIG. 1, there is shown, in accordance with an illustrative embodiment of the invention, a circuit for demodulating FM signals from a source 11; that is, the circuit converts frequency modulations originating at source 11 to baseband voltage variations representative of transmitted information which are directed to a load 12. A coupler 13 directs part of the input signal to a circulator 14 and the remainder to a hybrid coupler 15 via a variable attenuator 16 and transmission line 17. Connected to the circulator 14 is an injection-locked oscillator 18 having a center frequency which is approximately equal to the center frequency of the input FM signals.

In accordance with known principles, the input FM signal injection locks the oscillator 18 and causes the phase of output oscillations to vary as a function of the frequency of the FM input signals. The output of locked oscillator 18 is directed by circulator 14 and transmission line 19 to the hybrid coupler 15. The relation of output phase to input frequency deviations is illustrated by curve 20 of FIG. 2. As the graph illustrates, the change of output phase with respect to input frequency is substantially linear only over a small range of frequency variations.

The hybrid coupler 15 combines energy on lines 17 and 19 to generate two output components that are respectively directed along lines 22 and 23 to oppositely-poled square-law rectifying diodes 25 and 26. The outputs of the diodes are applied to opposite ends of a resistor 27 having a center tap 28 for deriving output energy that is transmitted to the load. As will be explained below, the voltage derived by center tap 28 varies linearly with the frequency modulations from source 11. For present purposes, the term "center tap" includes a tap the location of which has been adjusted to compensate for circuit non-symmetries.

Consider input voltage $V_{in}$ to be of the form $$V_{in} = A \cos \omega t \qquad 3.$$

where A is the amplitude of input voltage from source 11, $\omega$ is the angular frequency and $t$ is time. Coupler 13 and attenuator 16 are designed such that the amplitude $A_2$ delivered on line 17 to the hybrid coupler is of the form $$\sqrt{2}\, A_2 = (kA)/\sqrt{2} \qquad 4.$$

where $k$ is a constant. If coupler 13 is a 3 db coupler, the amplitude $A_c$ of current delivered to the oscillator 18 is $$A_c = A/\sqrt{2} \qquad 5.$$

Voltage generated by oscillator 18 and directed to transmission line 19 is of the form $$\sqrt{2}\, A_1 \cos(\omega t + \Phi) \qquad 6.$$

where $\sqrt{2}\, A_1$ is the voltage amplitude after adjustment by attenuator 21. As is known in the locked oscillator art, assuming a single-tuned oscillator without reactive-nonlinearity, the phase shift $\Phi$ of the oscillator output is given by $$\sin \Phi = -(\Delta\omega)/(\Delta\omega_{PL}) \qquad 7.$$

where $\Delta\omega$ is the difference between the locking frequency and the free-running frequency of the oscillator, and $\Delta\omega_{PL}$ is half the locking range of the oscillator as is illustrated in FIG. 2. $\Delta\omega_{PL}$ can be shown to be given by $$\Delta\omega_{PL} = \frac{\omega_0}{Q_E}\frac{A/\sqrt{9}}{\sqrt{2}A_1} \qquad (8)$$

where $Q_E$ is the external quality factor of the locking oscillator. Combining equations (7) and (8), phase shift $\Phi$ may be expressed as $$-\sin \Phi = 2\, Q_E\, (A_1)/(A)\, (\Delta\omega)/(\omega_0) \qquad 9.$$

Coupler 15 is a conventional four port hybrid coupler which, in response to input currents $I_1$ and $I_2$ will deliver energy to lines 22 and 23 having respective voltage components $V_1$ and $V_2$ of the form $$V_1^2 = A_1^2 + A_a^2 + 2A_1A_2 \sin \Phi \qquad 10.$$

$$V_2^2 = A_1^2 + A_2^2 - 2A_1A_2 \sin \Phi \qquad 11.$$

$V_1$ is directed to diode 25, while $V_2$ is directed to diode 26. The relative phasor configurations of $V_1$, $V_2$, $A_1$, and $A_2$ are shown in FIG. 3.

Detector diodes 25 and 26 deliver an output voltage on center tap 28 of the form $$V_{out} = M\frac{V_1^2 - V_2^2}{2} \qquad (12)$$

where M is the detector sensitivity. Combining equations (10), (11), and (12) gives $$V_{out} = M\frac{-4A_1A_2 \sin \phi}{2} \qquad (13)$$

from equation (9):

$$V_{out} = M\frac{4A_1A_2 2Q_E A_1 \Delta\omega}{2A\omega_0} = 4A_1^2\frac{A_2}{A}Q_E\frac{\Delta\omega}{\omega_0} \qquad (14)$$

and from equation (4):

$$V_{out} = 2\, k\, M\, Q_E\, A_1^2\, (\Delta\omega)/(\omega_0) \qquad 15.$$

Equation (15) illustrates that the output voltage is independent of input amplitude A or the modulation frequency $\omega_m$. Since the parameters can easily be adjusted so that the only variable on the right-hand side of the equation is $\Delta\omega$, the amplitude of $V_{out}$ will vary linearly with input frequency as desired. In this respect, the circuit differs from analogous prior art circuits in which response linearity is impaired by a sensitivity of the circuit to input amplitude A and modulation frequency $\omega_m$.

The circuit of FIG. 1 is particularly useful at microwave frequencies; that is, frequencies in excess of 500 megahertz. Coupler 13 may typically be a 3 db coupler, circulator 14 may be a ferrite circulator of known construction, and oscillator 18 may have as its active element a tunnel diode with an external circuit constructed in a known manner to give frequency locking. All transmission lines may be waveguides or coaxial cables; hybrid coupler 15 may be a waveguide coupler known as the "magic T."

FIG. 4 shows another technique for deriving and combining the FM signal and oscillator output. The locked oscillator 31 of FIG. 4 operates, in the manner described before, to deliver oscillations whose phase is controlled by frequency modulations from source 32. The FM signal is directed by circulator 33 and transmission line 34 to the oscillator 31, while the output from oscillator 31 is carried by the transmission line back toward the circulator.

In accordance with the invention, a pair of microwave probes 36, spaced a quarter wavelength apart, derive energy from the transmission line. It can be shown that part of the energy derived by probes 36 is FM signal energy from source 32, while another component is energy generated by oscillator 31. It will be shown below that, with the probes spaced a quarter wavelength apart, the energy derived is of the form given by equations (10) and (11).

As before, this energy is delivered to a balanced detector comprising oppositely-poled rectifying diodes 37 and 38 and derived by a center tap 39 of an output resistor 40 for delivery to a load 41. The probes may be of simple construction extending into the transmission line sufficiently to be excited by propagating fields. The probes are preferably movable in the axial direction for optimizing the output with respect to the oscillator center frequency.

In understanding the operation of the FIG. 4 device, consider the input voltage to the circulator to have an amplitude $A_L$ and the output voltage from the circulator to have an amplitude $A_o$. The electric field in transmission line 34 may be considered as comprised of two components, one, a wave traveling downwardly toward the oscillator with amplitude $A_d$, and the other, a wave traveling upwardly with amplitude $A_u$, where $$A_d = A_L e^{j(\omega t + \beta Z)} \qquad (16)$$

$$A_u = A_0 e^{j(\omega t - \beta Z)} e^{j\phi} \qquad (17)$$

where $\beta$ equals $2\pi/\lambda$. Let:

$$\rho = A_L/A_o \qquad 18.$$

Then the amplitude A of the total electric field in line 34 will vary as $$A = A_0(e^{-j\beta Z}e^{j\phi} + \rho e^{j\beta Z})e^{j\omega t} \qquad (19)$$

FIG. 6 is a graph of the electric field amplitude versus distance in transmission line 34 and shows the standing wave pattern that would obtain if the locking frequency $\omega_L$ equals the oscillator free-running frequency $\omega_F$. Consider one of the probes to be located at distance $Z_1$, ⅛ wavelength from the oscillator end of the line.

$$Z_1 = \lambda/8 = (\pi)/(4)\,(1)/(\beta \qquad 20.$$

The voltage $V_1$ on the probe is $$V_1 = k_1 A_0 (1 + \rho e^{j(2\beta Z_1 - \phi)}) e^{j(\omega t - \beta Z_1 + \phi)} \qquad (21)$$

$$|V_1| = k_1 A_0 |1 + \rho e^{j(2\beta\,\pi/4\,1/\beta)} e^{-j\phi}| \qquad (22)$$

$$|V_1|^2 = k_1^2 A_0^2 [(1 + 2\rho \sin\phi + \rho^2 \sin^2\phi) + (\rho^2 \cos^2\phi)] \qquad (23)$$

$$|V_1|^2 = k_1^2 A_0^2 (1 + \rho^2 + 2\rho \sin\phi) \qquad (24)$$

The other probe will be at location $Z_2$, where $$Z_2 = 3\,\frac{\lambda}{8} = 3/4\,\frac{\pi}{\beta} \qquad (25)$$

$$V_2 = k_2 A_0 (1 + \rho e^{j2\beta 3\pi/4\beta} e^{-\phi}) e^{j(\omega t - \beta Z_2 + \phi)} \qquad (26)$$

$$|V_2| = k_2 A_0 (|1 - \rho j e^{-\phi}|)(|e^{j(\omega t - \beta Z_2 + \phi)}|) \qquad (27)$$

$$|V_2| = k_2 A_0 |1 - \rho j e^{-\phi}| \qquad (28)$$

$$|V_2|^2 = k_2^2 A_0^2 [1 - 2\rho \sin\phi + \rho^2 \sin^2\phi + \rho^2 \cos^2\phi] \qquad (29)$$

$$|V_2|^2 = k_2^2 A_0^2 [1 + \rho^2 - 2\rho \sin\phi] \qquad (30)$$

Corresponding to equation (12):

$$V_{out} = \frac{M_2 |V_2|^2 - M_1 |V_1|^2}{2} \qquad (31)$$

where $M_1$ is the detector sensitivity of diode 37, $M_2$ is the detector sensitivity of diode 38, and $k_1$ and $k_2$ are constants associated respectively with the probes of diodes 37 and 38. Constants $k_1$ and $k_2$ are determined primarily by the coupling strength of probes 36 and can be adjusted to be equal or to give $$k_1^2 M_1 = k_2^2 M_2 = k^2 M \qquad 32.$$

Since, $$\rho \sin\phi = \frac{A_L}{A_0} \frac{(-\Delta\omega)}{\omega_{lp}} = -\frac{Q_E}{\omega_0} \Delta\omega \qquad (33)$$

then, $$V_{out} = 2 k^2 M A_o^2 (Q_E)/(\omega_o) \Delta\omega \qquad 34.$$

Equation (34) demonstrates that the output voltage is independent of input amplitude and modulation frequency, and is therefore a linear function of input frequency, as is desired.

Equations (24) and (30) may be written in the same form as equations (10) and (11) by making the substitution $$A_1 = k A_o \qquad 35.$$

$$A_2 = k A_L = \rho k A_o \qquad 36.$$

Then, $$V_1^2 = A_1^2 + A_2^2 + 2A_1A_2 \sin\Phi \qquad 37.$$

$$V_2^2 = A_1^2 + A_2^2 - 2A_1A_2 \sin\Phi \qquad 38.$$

While the most obvious use of my invention is as an FM demodulator, it can also be used to provide more accurate and efficient power amplification, as is illustrated in the circuit of FIG. 5. The circuit of FIG. 5 is of the type in which a relatively low-power signal from a source 51 is used to control the output frequency of an injection-locked oscillator 52, thereby to provide power amplification of the input frequency for transmission to a load 53. Thus, the frequency of the relatively high-power output of oscillator 52 is controlled by the relatively low-power frequency variations of source 51. In such devices, efficient and accurate operation can be increased if the center frequency of the oscillator 52 is made to track the input frequency, thereby changing the center frequency $\omega_o$ to center the locking range on the input frequency.

In accordance with the invention, probes 54 operate in the same manner as in FIG. 4 to derive energy that is detected by a balanced detector comprising diodes 55 and 56. The voltage derived by center tap 57 from output resistance 58 varies as a function of input frequency. This output is passed through a filter 59 which removes high frequency components and is applied to one electrode of a varactor diode 60. As is known, the reactance of a varactor diode varies as a function of bias voltage, and thus diode 60 operates to vary the resonant frequency of oscillator 52. The diode can therefore be used to change the resonant frequency as a monotonic function of applied bias voltage. This, of course, causes the center frequency of the locked oscillator to track or follow the input frequency.

The embodiments shown and described are intended only to be illustrative of the concepts involved. Various other modifications and embodiments may be made by those skilled in the art without departing from the spirit and scope of the invention.

What is claimed is:

1. An FM demodulator for generating an output voltage proportional to the frequency of an input signal comprising:

a circulator having a first port to which the input signal is applied;

a locked oscillator connected to the second port of the circulator, whereby the locked oscillator output phase is controlled by the input frequency;

a four-port hybrid coupler having first and second input ports and first and second output ports;

said hybrid coupler being of a type that generates combined signals of the form $$V_1^2 = A_1^2 + A_2^2 + 2A_1A_2 \sin\Phi$$

$$V_2^2 = A_1^2 + A_2^2 - 2A_1A_2 \sin\Phi$$

where $A_1$ is the amplitude of voltage at the first input port, $A_2$ is the amplitude of voltage at the second input port, $V_1$ is the voltage of the combined signal at the first output port, $V_2$ is the voltage of the combined signal at the second output port, and $\Phi$ is a phase difference of voltages at the first and second input ports;

means for applying part of the input signal to the first input port of the hybrid coupler;

means for applying the output of the locked oscillator to the second port of the hybrid coupler;

first and second diodes each having anode and cathode contacts;

the anode of the first diode and the cathode of the second diode being connected to opposite ends of an output resistance;

the cathode of the first diode and the anode of the second diode being connected to different output ports of the hybrid coupler;

and means for deriving an output voltage from a center tap of the output resistance.

2. An FM demodulator for generating an output voltage proportional to an input frequency comprising a circulator having a first port at which the input signal is applied;

a locked oscillator connected by a transmission line to the second port of the circulator, whereby the locked oscillator output is controlled by the input frequency;

first and second probes spaced a quarter wavelength apart and extending into said transmission line for deriving energy therefrom;

the first probe being connected to the anode contact of a first diode;

the second probe being connected to the cathode contact of a second diode;

said diodes being connected to opposite ends of an output resistance;

and means for deriving an output voltage from a center tap of the output resistance.

3. The circuit of claim 2 wherein:

the transmission line is a coaxial cable;

and the probes are axially movable along said coaxial cable.

4. The circuit of claim 3 further comprising:

means for controlling the center frequency of the locked oscillator comprising means for applying said output voltage to the locked oscillator, whereby the center frequency of the locked oscillator is controlled by the input frequency.

* * * * *